United States Patent
Huang

(10) Patent No.: US 8,727,599 B2
(45) Date of Patent: May 20, 2014

(54) LIGHT GUIDE PLATE AND BACKLIGHT MODULE USING SAME

(75) Inventor: Jianfa Huang, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 0 days.

(21) Appl. No.: 13/579,032

(22) PCT Filed: Jun. 19, 2012

(86) PCT No.: PCT/CN2012/077121
§ 371 (c)(1),
(2), (4) Date: Aug. 14, 2012

(87) PCT Pub. No.: WO2013/185366
PCT Pub. Date: Dec. 9, 2013

(65) Prior Publication Data
US 2013/0329457 A1    Dec. 12, 2013

(51) Int. Cl.
*F21V 7/04* (2006.01)

(52) U.S. Cl.
USPC ............. 362/616; 362/612; 362/231; 349/61; 349/62; 349/64

(58) Field of Classification Search
USPC ......... 362/612, 613, 231, 616, 619, 620, 625, 362/626; 349/61–65; 385/129–132, 901
See application file for complete search history.

(56) References Cited

U.S. PATENT DOCUMENTS

| | | | |
|---|---|---|---|
| 2004/0130884 A1* | 7/2004 | Yoo et al. | 362/31 |
| 2007/0188677 A1* | 8/2007 | Souk et al. | 349/65 |
| 2008/0030650 A1* | 2/2008 | Kitagawa et al. | 349/65 |
| 2011/0013421 A1* | 1/2011 | Um | 362/612 |
| 2011/0141401 A1* | 6/2011 | Lee et al. | 349/65 |

FOREIGN PATENT DOCUMENTS

CN    101097054 A    1/2008

* cited by examiner

*Primary Examiner* — Anh Mai
*Assistant Examiner* — Kevin Quarterman
(74) *Attorney, Agent, or Firm* — Cheng-Ju Chiang

(57) ABSTRACT

The present invention provides a light guide plate and a side-edge backlight module using the light guide plate. The light guide plate includes a plurality of air barrier walls formed therein. The air barrier walls divide the light guide plate into a plurality of sections. With the arrangement of air barrier walls between independent sections of the light guide plate according to the present invention, by means of total reflection, light incident into each independent section is blocked from penetrating through the air gaps and is thus confined within the independent section. Thus, brightness sectioning and independent control of sectionalized brightness of the light guide plate can be realized and improved light isolation result, improved yield, being mass producible, and low cost can be achieved. The side-edge backlight module uses the light guide plate so as to realize brightness sectioning and independent control of sectionalized brightness of the backlight module.

3 Claims, 4 Drawing Sheets

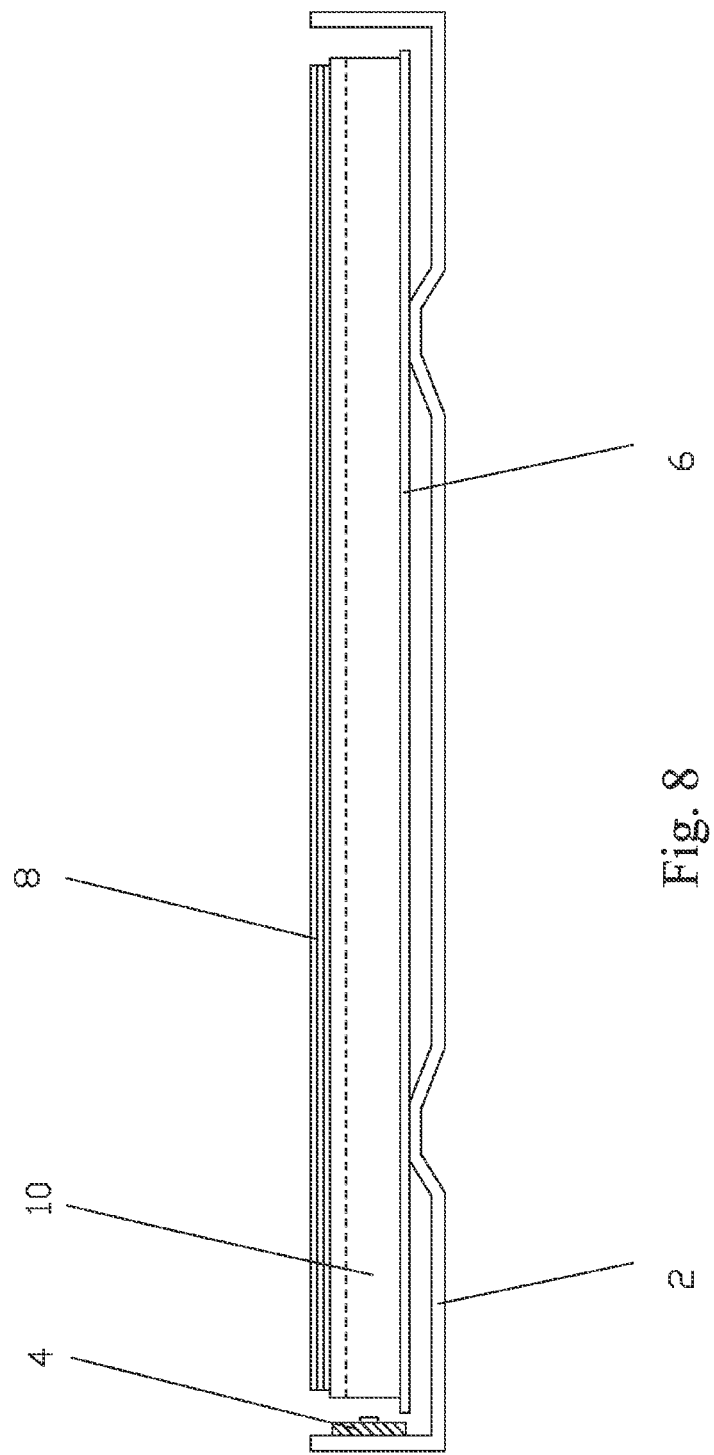

LIGHT GUIDE PLATE AND BACKLIGHT MODULE USING SAME

BACKGROUND OF THE INVENTION

1. Field of the Invention

The present invention relates to the field of backlight module of liquid crystal display, and in particular to a design of a light guide plate of a side-edge backlight module.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that liquid crystal molecules are interposed between two parallel glass substrates and a plurality of vertical and horizontal fine electrical wires is arranged between the two glass substrates, whereby the liquid crystal molecules are controlled to change direction by application of electricity in order to refract light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module arranges a light source, such as a cold cathode fluorescent lamp (CCFL) or a light-emitting diode (LED) at the back side of the liquid crystal panel to form a planar light source that directly provides lighting to the liquid crystal panel. The side-edge backlight module arranges a backlight source of LED light bar at an edge of a back panel to be located rearward of one side of the liquid crystal panel. The LED light bar emits light that enters a light guide plate (LGP) through a light incident face of the light guide plate and is projected out through a light exit face of the light guide plate, after being reflected and diffused, to thereby transmit through an optic film assembly and form a planar light source for the liquid crystal display panel.

Brightness sectioning and independent control of the backlighting of a backlight module is the basis of various techniques, such as local dimming, scanning 3D, improvement of dynamic contrast, and power saving. In a traditional side-edge backlight module, light dispersion caused by the light guide plate makes the results of these techniques of local dimming, scanning 3D, improvement of dynamic contrast, and power saving poor. To overcome such a problem, the light guide plate is designed in such a way that the light guide plate is formed with microstructures thereon. However, the conventional microstructure-carried light guide plate is deficient in showing poor light isolation and poor yield, being poor for mass production, and suffering severe warping and deformation after absorbing humidity. In addition, the cost is higher than regular light guide plate by at least 25%.

SUMMARY OF THE INVENTION

An object of the present invention is to provide a light guide plate, which realizes brightness sectioning and independent control of sectional brightness for light guide plate and shows improved light isolation and good yield, is mass producible, and has low cost.

Another object of the present invention is to provide a side-edge backlight module, which realizes brightness sectioning and independent control of sectional brightness for backlight module and may provide improved light isolation with reduced cost.

To achieve the above objects, the present invention provides a light guide plate, which comprises a plurality of air barrier walls formed therein. The air barrier walls divide the light guide plate into a plurality of sections.

The air barrier walls are of a constant width configuration extending upward from a bottom face of the light guide plate to show an open structure that has an open end.

The light guide plate has a thickness of 4 mm and the air barrier walls have a width of 0.2 mm-1.5 mm and a depth of 3 mm-3.5 mm.

The air barrier walls are of an isosceles triangular configuration, which extends upwards from a bottom face of the light guide plate to show an open structure that has an open end.

The light guide plate has a thickness of 4 mm and the isosceles triangle has a height of 3 mm-3.5 mm and an apex angle of 8°-15°.

The air barrier walls are of a constant width configuration that is completely located within the light guide plate to show a closed structure.

The light guide plate has a thickness of 4 mm and the air barrier walls have a width of 0.2 mm-1.5 mm and a depth of 3 mm-3.5 mm.

The air barrier walls are of an isosceles triangular configuration completely located within the light guide plate to show a closed structure.

The light guide plate has a thickness of 4 mm and the isosceles triangle has a height of 3 mm-3.5 mm and an apex angle of 8°-15°.

The present invention also provides a light guide plate, which comprises a plurality of air barrier walls formed therein, the air barrier walls dividing the light guide plate into a plurality of sections;

wherein the air barrier walls are of a constant width configuration extending upward from a bottom face of the light guide plate to show an open structure that has an open end; and wherein the light guide plate has a thickness of 4 mm and the air barrier walls have a width of 0.2 mm-1.5 mm and a depth of 3 mm-3.5 mm.

The present invention further provides a side-edge backlight module, which comprises: a backplane, a backlight source arranged inside the backplane, a light guide plate arranged inside the backplane to correspond to the backlight source, a reflector plate disposed on an undersurface of the light guide plate, and an optic film assembly disposed on a top surface of the light guide plate. The light guide plate comprises a plurality of air barrier walls formed therein. The air barrier walls dividing the light guide plate into a plurality of sections.

The efficacy of the present invention is that the present invention provides a light guide plate and a side-edge backlight module using the light guide plate. The light guide plate comprises air barrier walls respectively arranged between independent sections, whereby by means of total reflection, light incident into each independent section is blocked from penetrating through the air gaps and is thus confined within the independent section. Thus, brightness sectioning and independent control of sectionalized brightness of the light guide plate can be realized and improved light isolation result, improved yield, being mass producible, and low cost can be achieved. The side-edge backlight module uses the light guide plate so as to realize brightness sectioning and independent control of sectionalized brightness of the side-edge backlight module to achieve improved light isolation with reduced cost.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of one or more embodiments of the present invention, with reference to the attached drawings. In the drawings:

FIG. 8 is a schematic view showing a side-edge backlight module according to the present invention.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
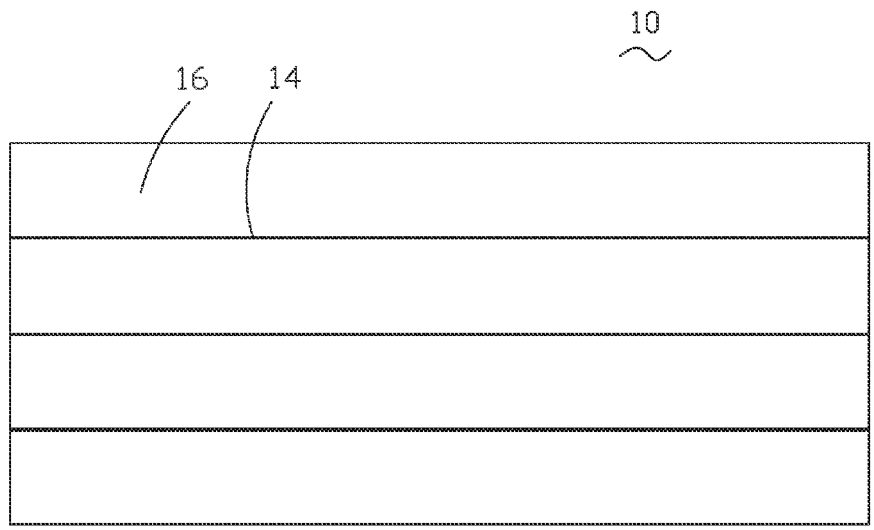
FIG. 1 is a top plan view showing a light guide plate according to a first embodiment of the present invention.
Figure 2:
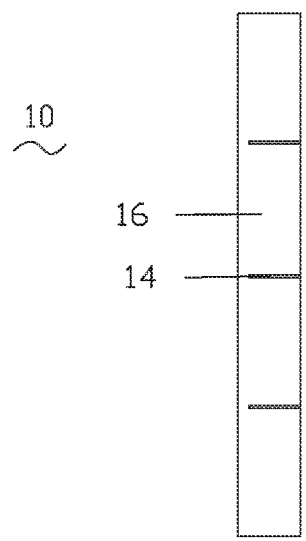
FIG. 2 is a left side elevational view of FIG. 1.

Referring to FIGS. 1 and 2, the present invention provides a light guide plate 10, in which a plurality of air barrier walls 14 is formed. The air barrier walls 14 divide the light guide plate 10 into a plurality of sections 16. The number of the air barrier walls 14 formed is determined according to the number of sections 16 desired.

In the instant embodiment, the air barrier walls 14 are of a constant-width configuration and each is formed by extending upward from a bottom face of the light guide plate 10 to show such an open structure that an end is open. If the light guide plate 10 has a thickness of 4 mm, then the air barrier walls 14 have a width of 0.2 mm-1.5 mm and a depth of 3 mm-3.5 mm. The air barrier walls 14 are formed with hot stamping techniques, in which a cut die is heated to such a temperature (depending on the material of the light guide plate 10) as to melt the light guide plate 10 and is pressed into the light guide plate 10. Then, being gradually cooled down, the cut die is removed to form the air barrier walls 14.

Figure 3:
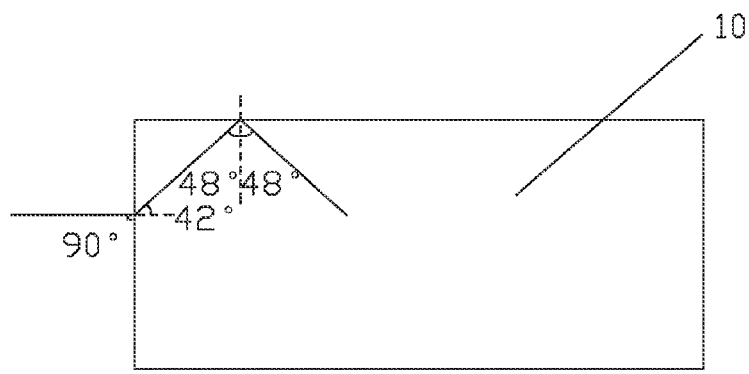
FIG. 3 is a schematic view illustrating total reflection occurring in the light guide plate according to the present invention.

The light guide plate 10 is made of for example PMMA (Poly(methyl methacrylate)). The light guide plate 10 has an index of refraction of 1.49. According to the theory of total reflection, it can be determined that the critical angle is around 42° for total reflection for light emitting from the light guide plate 10 into the surrounding air. Thus, total reflection of light will surely occurs when the incident angle of light traveling from the interior of the light guide plate 10 toward an interface between the light guide plate 10 and an air barrier wall 14 is greater than 42°. Referring to FIG. 3, which is a schematic view illustrating total reflection occurring in the light guide plate 10, light enters the light guide plate 10 from a side face of the light guide plate 10 and may have the greatest incident angle of 90°. The light, when entering the light guide plate 10, shows a refraction angle of 42°. With the light propagating forward, the light transmits out through the interface between the light guide plate 10 and one of the air barrier walls 14 at an emergence angle of 48°, which exceeds the critical angle of the light guide plate 10 in a condition of traveling from an optically denser medium into an optically thinner medium, making it meeting the conditions of total reflection, so that total reflection occurs.

Figure 4:
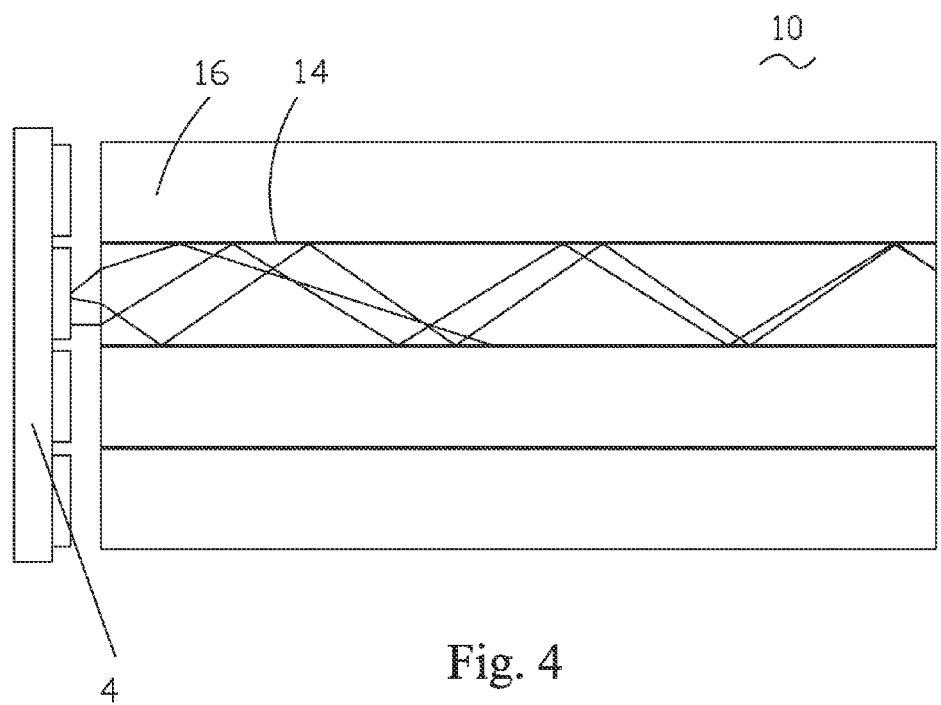
FIG. 4 is a schematic view illustrating light subjected to total reflection in the light guide plate according to the present invention.

Referring to FIG. 4, based on such a principle, arranging an air barrier wall 14 between two adjacent sections 16 of the light guide plate 10 blocks light from emitting outward due to total reflection occurring when light from a backlight source 4 travels from one of the sections 16 of the light guide plate 10 toward the air barrier wall 14. This confines the light incident into the section 16 of the light guide plate 10 between two interfaces formed by two air barrier walls 14, namely confining the light in the section 16. Consequently, the light within one of the sections 16 is blocked from traveling to an adjacent section 16 whereby isolation of light within the sections 16 of the light guide plate 10 is realized. Excellent sectionalized light isolation can be achieved.

Thus, through the arrangement of the air barrier walls 14, the present invention realizes brightness sectioning for light guide plate and provides independent control of sectional brightness for the sections 16, thereby showing improved light isolation result and good yield, being mass producible, and having low cost.

Figure 5:
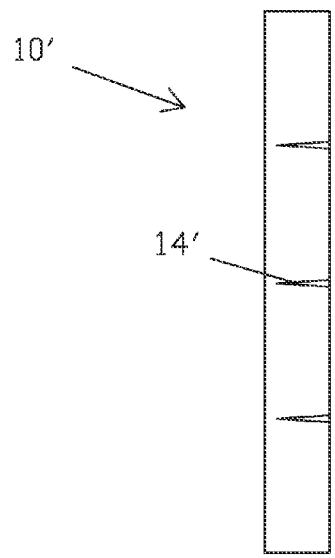
FIG. 5 is a left side elevational view of a light guide plate according to a second embodiment of the present invention.

Referring to FIG. 5, a second embodiment of the present invention is shown. In the instant embodiment, the air barrier walls 14' are of an isosceles triangular configuration, which extends upwards from the bottom face of the light guide plate 10' to show such an open structure that an end is open. If the light guide plate 10' has a thickness of 4 mm, then the isosceles triangle has a height of 3 mm-3.5 mm and an apex angle of 8°-15°. The air barrier walls 14' are formed with hot stamping techniques, namely a die being used to form the air gaps, in which a cut die is heated to such a temperature as to melt the light guide plate 10' and is pressed into the light guide plate 10'. Then, after being gradually cooled down, the cut die is removed to form the air barrier walls 14'.

Figure 6:
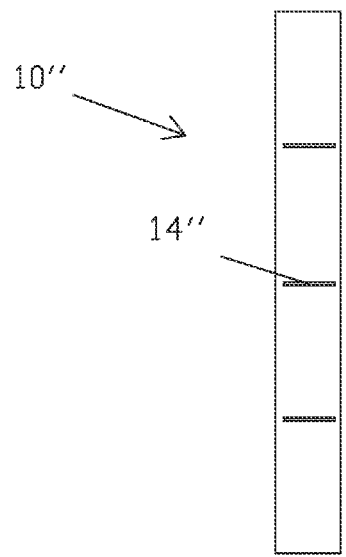
FIG. 6 is a left side elevational view of a light guide plate according to a third embodiment of the present invention.

Referring to FIG. 6, a third embodiment of the present invention is shown. In the instant embodiment, the air barrier walls 14" are of a constant width configuration completely located within the light guide plate 10" to show a closed structure. If the light guide plate 10" has a thickness of 4 mm, then the air barrier walls 14" have a width of 0.2 mm-1.5 mm and a depth of 3 mm-3.5 mm. A semi-product of the light guide plate 10" that is in the form of the first embodiment having open air barrier walls is first made with an injection mold and then, the semi-product of the light guide plate 10" is dipped in a liquid of molten material of the light guide plate 10" in such a way that the dipping depth is well controlled so as to close the air barrier walls 14 of the semi-product of the light guide plate 10" thereby forming the closed air barrier walls 14" of the instant embodiment. The light guide plate 10" made in this way shows improved stiffness.

Figure 7:
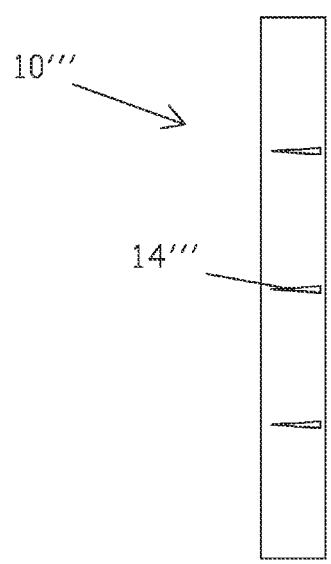
FIG. 7 is a left side elevational view of a light guide plate according to a fourth embodiment of the present invention.

Referring to FIG. 7, a fourth embodiment of the present invention is shown. In the instant embodiment, the air barrier walls 14''' are of an isosceles triangular configuration completely located within the light guide plate 10''' to show a closed structure. If the light guide plate 10''' has a thickness of 4 mm, then the isosceles triangle has a height of 3 mm-3.5 mm and an apex angle of 8°-15°. The instant embodiment adopts the same manufacturing process as the third embodiment.

Referring to FIG. 8, the present invention also provides a side-edge backlight module, which comprises a backplane 2, a backlight source 4 arranged inside the backplane 2, a light guide plate 10 arranged inside the backplane 2 to correspond to the backlight source, a reflector plate 6 disposed on an undersurface of the light guide plate 10, and an optic film assembly 8 disposed on a top surface of the light guide plate 10. The side-edge backlight module according to the present invention uses the above described light guide plate 10 so as to realize brightness sectioning and independent control of sectionalized brightness and thus achieve improved light isolation with reduced cost. The light guide plate 10 may also be replaced by other embodiments.

In summary, the present invention provides a light guide plate and a side-edge backlight module using the light guide plate. The light guide plate comprises air barrier walls respectively arranged between independent sections, whereby by means of total reflection, light incident into each independent section is blocked from penetrating through the air gaps and is thus confined within the independent section. Thus, brightness sectioning and independent control of sectionalized brightness of the light guide plate can be realized and improved light isolation result, improved yield, being mass producible, and low cost can be achieved. The side-edge backlight module uses the light guide plate so as to realize brightness sectioning and independent control of sectionalized brightness of the side-edge backlight module to achieve improved light isolation with reduced cost.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A light guide plate, comprising a plurality of air barrier walls formed therein, the air barrier walls dividing the light guide plate into a plurality of sections, wherein the air barrier walls are of an isosceles triangular configuration completely located within the light guide plate to show a closed structure.

2. The light guide plate as claimed in claim 1, wherein the light guide plate has a thickness of 4 mm and the isosceles triangle has a height of 3 mm-3.5 mm and an apex angle of 8°-15°.

3. A side-edge backlight module, comprising: a backplane, a backlight source arranged inside the backplane, a light guide plate arranged inside the backplane to correspond to the backlight source, a reflector plate disposed on an undersurface of the light guide plate, and an optic film assembly disposed on a top surface of the light guide plate, the light guide plate comprising a plurality of air barrier walls formed therein, the air barrier walls dividing the light guide plate into a plurality of sections, wherein the air barrier walls are of an isosceles triangular configuration completely located within the light guide plate to show a closed structure.

* * * * *